United States Patent [19]

Sugiuchi et al.

[11] 4,300,381
[45] Nov. 17, 1981

[54] METHOD FOR PRODUCING INSERT FOR DIESEL ENGINE COMBUSTION CHAMBER

[75] Inventors: Toshiyasu Sugiuchi, Machida; Susumu Aoyama, Shohnan; Hiroshi Tokisue, Narashino, all of Japan

[73] Assignees: Riken Corporation, Tokyo; M.H. Center Limited, Saitama, both of Japan; a part interest

[21] Appl. No.: 178,623

[22] Filed: Aug. 15, 1980

[51] Int. Cl.³ .............................................. B21D 31/02
[52] U.S. Cl. ........................................ 72/327; 72/334; 72/356; 219/69 W
[58] Field of Search ................. 72/354, 356, 358, 359, 72/360, 341, 334, 327, 377; 219/69 R, 69 W

[56] References Cited

U.S. PATENT DOCUMENTS

| | | | |
|---|---|---|---|
| 1,040,265 | 10/1912 | Bosler | 72/334 |
| 3,124,876 | 3/1964 | Putetti | 72/334 |
| 3,186,209 | 6/1965 | Friedman | 72/356 X |
| 4,078,415 | 3/1978 | Koch et al. | 72/356 |

Primary Examiner—Leon Gilden
Attorney, Agent, or Firm—Kalish & Gilster

[57] ABSTRACT

A method of producing an insert for the combustion chamber of a diesel engine having an oblique injection port comprising inserting a cylindrical work blank into a die, then cold- or hot-compressing such cylindrical work blank between a punch and counter-punch to form a compressed center-recessed shape, forming an oblique recess in at least one side of the bottom of the center recess of said shape at such an end position as to correspond to the injection port to be formed, and then developing a hole in said oblique recess in conformity with the configuration and extent thereof.

13 Claims, 20 Drawing Figures

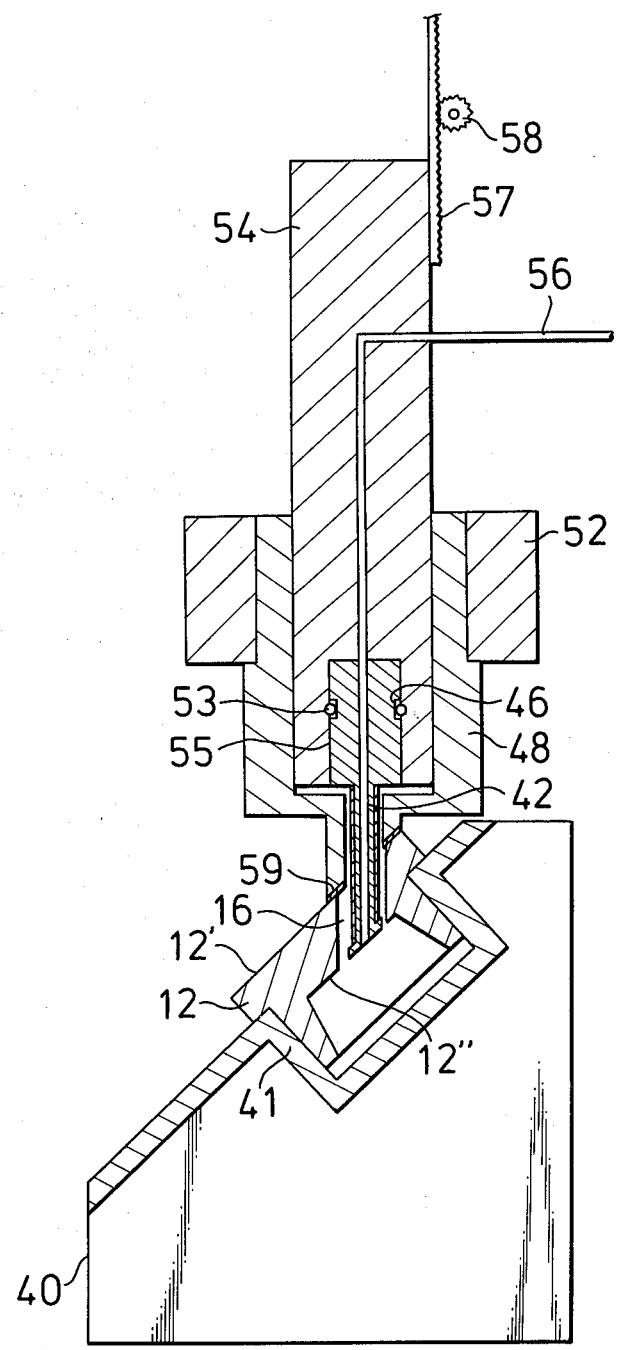

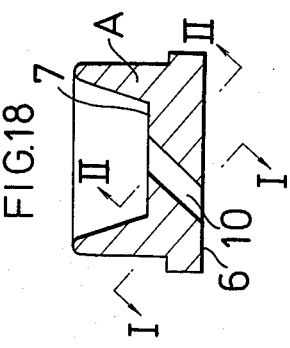
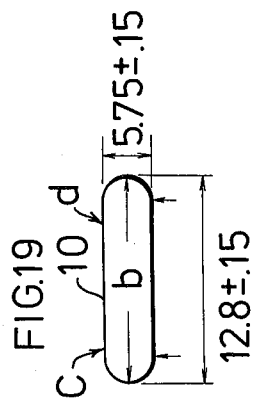
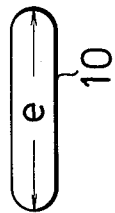
FIG.18
FIG.19
FIG.20
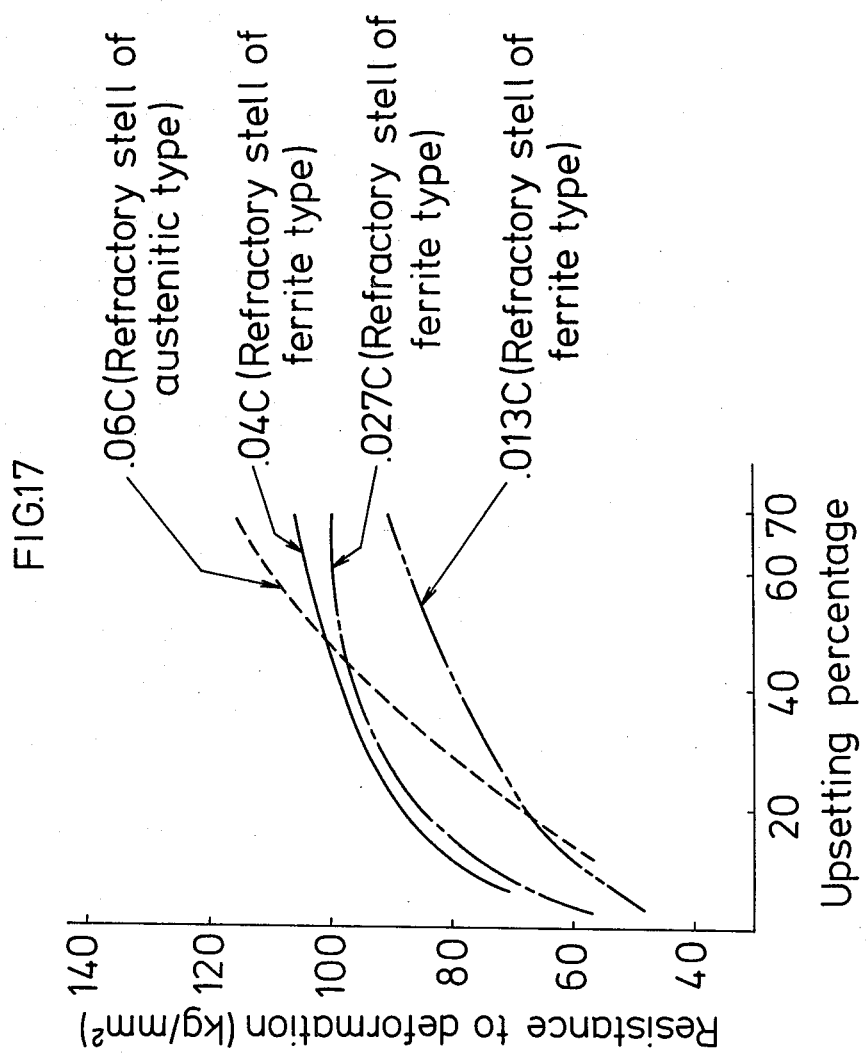
FIG.17

METHOD FOR PRODUCING INSERT FOR DIESEL ENGINE COMBUSTION CHAMBER

BACKGROUND AND SUMMARY OF THE INVENTION

This invention relates, in general, to diesel engines and, more particularly, to an insert for a combustion chamber of diesel engines. The insert to be received within the cylinder head within the combustion chamber of a diesel engine must have high refractory properties due to the exposure to hot combustion gases and because of the required sizing precision. Heretofore, such inserts have been produced either by the investment casting process or by the cutting of round bar stock. Although the investment casting process has recently been developed to such an extent that complex and close controls of high sizing accuracy and crystalline granularity can be accomplished in producing refractory castings such as the gas turbine parts of a jet engine or the like, such process is not suitable for the production of inserts for the combustion chambers of diesel engines because of the numerous complex steps which would extend the casting period with attendant high production cost. Such inserts requiring high refractory properties must, necessarily, be fabricated of refractory steel, and such is, in general, relatively amenable to the cutting process. Moreover, the cutting process of the round bar has such a remarkably low yield as to make the costs for the material and for effecting the working procedures uneconomical. These drawbacks are especially involved wherein the inserts are provided with an injection port of oblique character, which ought to be produced by the cutting process as it is quite difficult to form such port. More specifically, this difficulty is most apparent in the machining process since the drill must usually be turned in such a manner so that it is difficult to form a hole having a shape other than round. Accordingly, the machining process is not suitable for forming a hole having other than a round shape, such as, for instance, square, rectangular, oval, or semi-circular; and this is particularly true for forming an oblique opening, that is, one whose major axes is inclined with respect to the work surface. Such oblique opening could be worked by the three-dimensional feeds of the table of a milling machine. If the material to be cut is made of refractory or extremely hard material, the life of the cutting tool is invariably short and the cutting operation requires a lengthy period whereby production costs are materially increased. Therefore, it has been found that the machining process is not suitable for mass-produced products such as the aforesaid inserts. The cutting tools are considerably worn during the process of cutting hard or highly refractory materials so that the maintenance of such tools, as well as the need for constant replacement, adds further to the production cost. Also, from the standpoint of sizing accuracy, since the diameter of the cutting tool is gradually decreased through use, the spindle position must be accordingly continually adjusted. Although the incorporation of an appropriate correcting device is not impossible, the cost and price of the milling machine as a whole becomes so high as to make the machining process prohibitive.

A prior art effort for producing an insert having an oblique injection port has been attempted by causing the insert material to be of multi-part character and then assembling the discrete parts into a whole after the injection port having the inclined hole has been cut. However, this method is inadequate since the component, individual parts each require cutting and working, and then welding and finishing steps. Manifestly, with such discrete elements, the method steps are multiplied and thus cause problems in material yield and in production cost.

In another effort to produce an insert of the character stated, there has been proposed the process of inserting into a die a disc-shaped or cylindrical refractory steel blank containing less than 0.06% of carbon, by cold- or hot-compressing the steel blank between a punch and a counter-punch to thereby compress the blank into a generally center-recessed shape and with the formation of a hole in the bottom. Since the refractory steel is cold- or hot-forged, the method thus disclosed is adequate in sizing accuracy, productive, and reliable as an intermediate product is formed before the injection port has been developed. However, this method requires considerable time and costly labor in the hole-forming process because the conventional method is adopted to form the hole in such intermediate product.

With a view to overcoming the problems stated, the present invention has been conceived and developed to produce an insert at low cost by reducing the portion to be formed with a hole, while facilitating the hole-forming step by developing a unique recess having a similar shape as the injection port either in the outer side or in the outer and inner sides or such reduced portion simultaneously with the forming of the insert work material.

More specifically, the present invention contemplates the provision of a method for producing an insert for diesel engine combustion chambers which essentially comprises the steps of inserting a cylindrical work blank into a die; cold- or hot-compressing said work blank between a punch and counter-punch to develop a center-recessed shape; forming an oblique recess, that is, one axially inclined to the longitudinal axis of the workpiece in the outer side of the base of such shape at such a position as to correspond to the injection port of the insert to be formed simultaneously with or after the compressing step; and forming a corresponding oblique opening in said oblique recess.

BRIEF DESCRIPTION OF THE DRAWINGS

FIG. 12 is a fragmentary transverse vertical sectional view illustrating the step following that illustrated in FIG. 11.

FIG. 13 (II) is a top plan view of the electrode.

FIG. 17 is a graph showing the relationship between the resistance to deformation and the upsetting percentage.

FIG. 18 is a transverse vertical sectional view of the preferred form of the insert constructed pursuant to the method of the present invention.

FIG. 19 is a partial transverse sectional view taken along the line I—I of FIG. 18 illustrating the configuration of the opening.

FIG. 20 is a horizontal transverse sectional view taken along the line II—II of FIG. 18 but illustrating only the intervening portion of the opening.

DESCRIPTION OF THE INVENTION

In essence, the present invention contemplates a method for producing an insert for a diesel engine combustion chamber which comprises inserting a cylindrical workpiece into a die; cold- or hot-compressing said workpiece between a punch and a counter-punch to form a center-recessed shape; forming an oblique recess in the outer surface of the bottom of the workpiece; and then forming said oblique recess into an obliquely extending port-defining opening.

Figure 1:
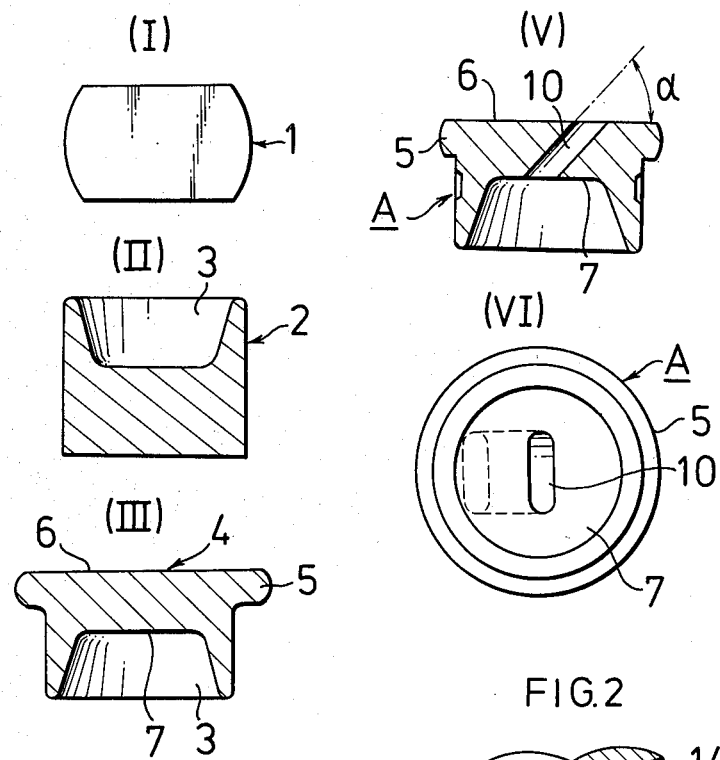
FIG. 1 (I)–(VI), inclusive, sequentially illustrates the stages in production of an insert for a diesel engine combustion chamber constructed in accordance with the method of the present invention with (I) being a side elevational view, (II)–(V) being transverse vertical sectional views, and (VI) being a top plan view.

Referring now by reference characters to the drawings; A designates an insert for fitted disposition within the cylindrical head of a diesel engine and, as shown in FIG. 1 (V), comprises a body having a base outer wall 6 and being open at its opposite end through a center recess 3 having a bottom wall 7 planarwise parallel to base wall 6; there being a peripheral flange 5 about said insert A adjacent base wall 6. Opening at its opposite ends through base wall 6 and recess bottom wall 7 is an obliquely extending opening 10 constituting a port for purposes presently appearing. The axis of opening 10 may be at an angle from 15°–75° to the longitudinal axis of insert A as indicated at α.

Figure 2:
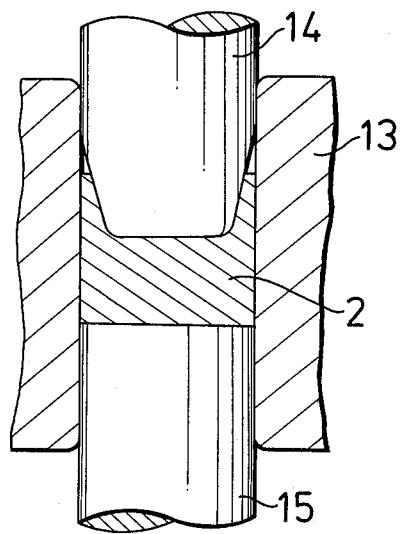
FIG. 2 is a vertical view in partial section illustrating the insert work blank as subjected to a forming die constituting the first step of the method of the present invention.

Insert A is formed of refractory steel and from a general cylindrical work blank indicated at 1 (see FIG. (I)) which is inserted into a die 13 fabricated of a superhard alloy for being vertically set between an upper punch 14 and a lower counter-punch 15 which latter is also of super-hard alloy (see FIG. 2). By action of punch 14 by the cold- or hot-forging process, work blank 1 is formed into an intermediate member indicated at 2 having said center recess 3, which is of frusto-conical contour. Punch 14 is then lifted with intermediate work member 2 being expelled by action of counter-punch 15.

Figure 3:
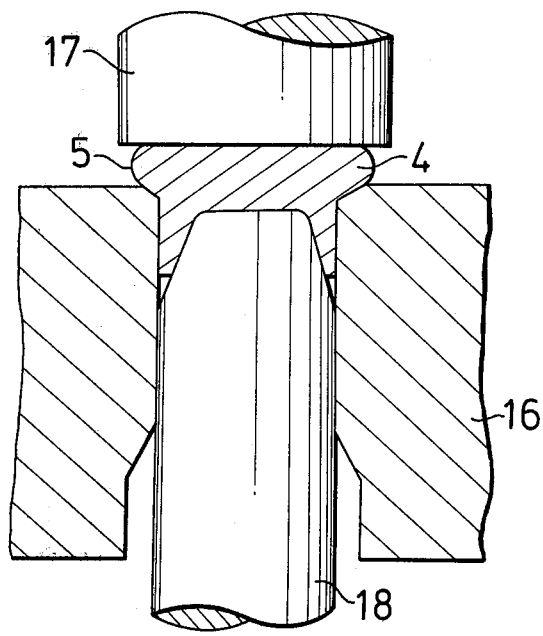
FIG. 3 is a vertical view in partial section illustrating the formation of the insert in accordance with the second major step of the method of the present invention.
Figure 4:
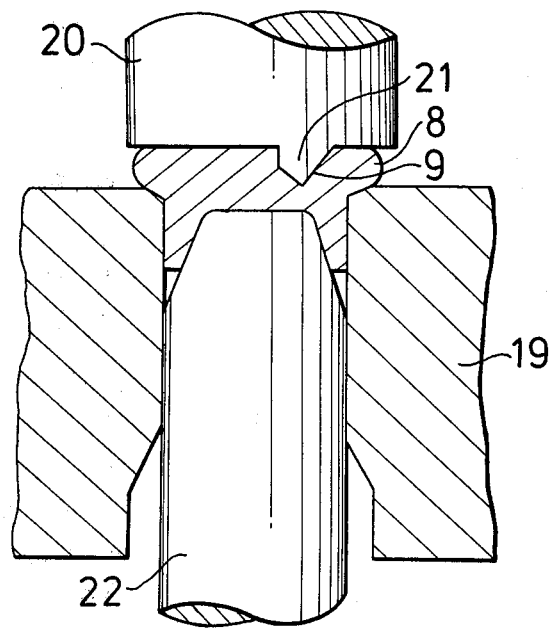
FIG. 4 is a vertical view in partial section illustrating the formation of the insert in accordance with the third major step of the method of the present invention.
Figure 6:
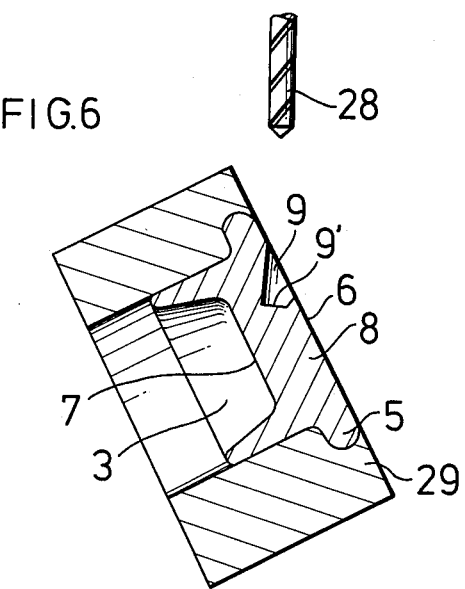
FIG. 6 is a vertical sectional view illustrating the partially formed insert of the present invention positioned by the holing step as may be performed subsequent to the step illustrated in FIG. 4.

As shown in FIG. 3, member 2 is inverted and disposed within a second die 16 for disposition between an upper punch 17 and a lower counter-punch 18 which are fabricated of a super-hard alloy. The intermediate work member 2 is pressed by action of punch 17 by the cold- or hot-forging process into an advanced work member 4 having formed thereon said flange 5. Thereupon, punch 17 is lifted and said member 4 is expelled from die 16 by counter-punch 18. A forming machine (not shown) provided with a die 19 and a counter-punch 22, which correspond structurally to die 16 and counter-punch 18, respectively, is loaded with advanced work member 4 which is subjected to the action of a punch 20, also by the cold- or hot-forging process, to develop a near-complete product 8 having an inclined or obliquely extending recess 9 opening through the outer bottom wall by means of a projection 21 extending from the pressure side of punch 20, said projection 21 in longitudinal section being generally triangularly shaped, but being substantially oval in horizontal section. Product 8, so formed, is illustrated in FIG. 1 (IV) and said product is subjected to a holing procedure, as illustrated in FIG. 6 for development of opening or port 10. As shown in FIG. 6, product 8 is inserted within a work holder 29 so that the base 9' of recess 9 is disposed horizontally for a subjection to the action of a cutting tool 28 for development of said opening or port 10. For effecting the holing step, cutting, spark, electrolytic, and punching processes can be adopted with the present invention. These processes may be used individually or in selected combinations to form the unique oblique opening or port 10.

As described thus far, it should be apparent that the near-complete product 8 may be formed directly from work member 2 as shown in FIG. 1 (II) or from the advanced work member 4 (FIG. (III)) as described.

Figure 5:
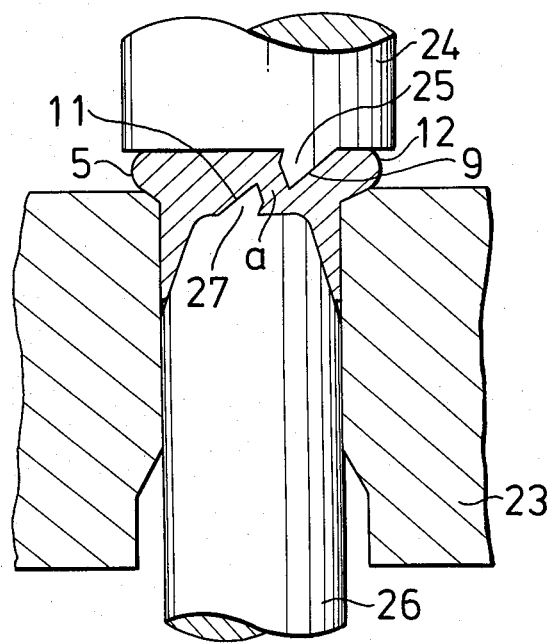
FIG. 5 is a vertical view in partial section illustrating the formation of the insert in accordance with an optional manner of performing the fourth major step of the method of the present invention.
Figure 7:
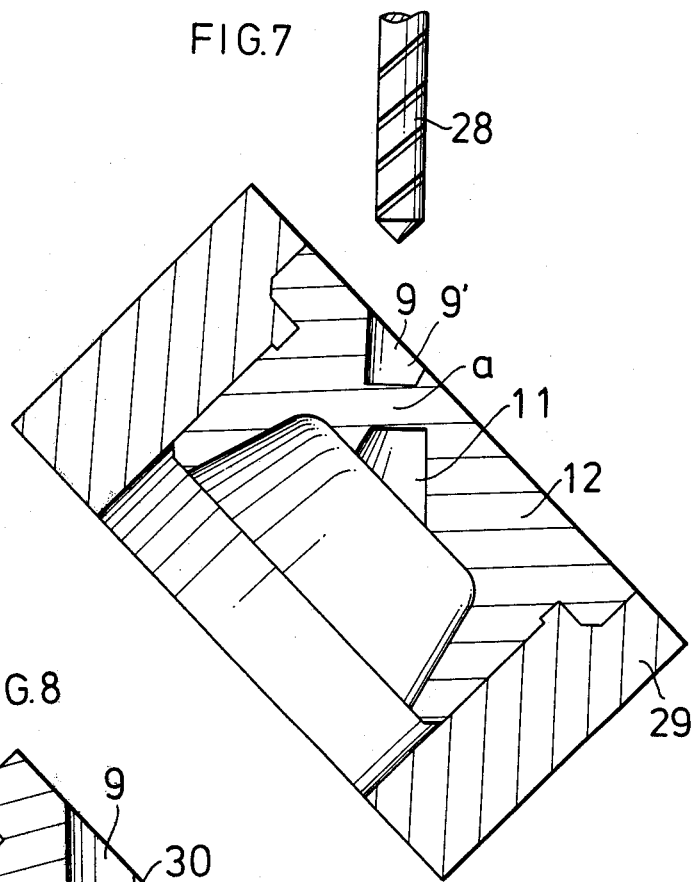
FIG. 7 is a vertical sectional view illustrating the partially formed insert of the present invention positioned by the holing step as may be performed subsequent to the step illustrated in FIG. 5.
Figure 8:
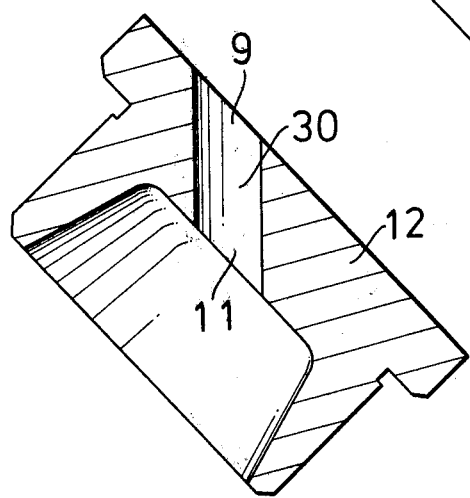
FIG. 8 is a transverse vertical sectional view illustrating the preferred form of insert produced in accordance with the method of the present invention.
Figure 9:
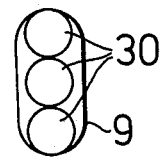
FIG. 9 is a top plan view of the recess of the insert as may be formed pursuant to the step illustrated in FIG. 7.

Furthermore, it should be understood that the method of the present invention is not to be construed as limited to the formation of opening or port 10 by cutting through recess 9 from outer base wall 6 as, if desired, another inclined recess 11 may be formed through wall 7 in alignment with the recess formed in wall 6 with there being a limited intervening portion a of relative thinness so as to facilitate the hole cutting operation as shown in FIG. 5. The resultant unfinished product is identified by the reference numeral 12 in said FIGURE wherein the particular die is indicated at 23, the counter-punch at 26, and the punch at 24 with the recesses forming extensions being respectively designated 27, 25. By means of a cutting tool 28, the reduced portion a is penetrated and worked to complete the formation of opening or port 10 by reason of the cooperating recesses 9, 11. The hole-forming process may be effected, as illustrated in FIG. 7, with the provision of a plurality (e.g. three (3)), as shown in FIG. 9, of oblique apertures 30 of resultant reduced cross section which may then be subjected to the electrolytic process to form the ultimate opening or port 10. This particular modified method can more readily conduce to the formation of opening or port 10 than the above-described direct method as the cutting tool 28 is used to form the temporary oblique apertures 30. Since the electrolytic process is performed with respect to the temporary oblique apertures 30, the passage of an electrolytic electrode through such apertures is easily accomplished and thus constitutes an improvement upon the usual electrolytic process. It will also be observed that the temporary oblique apertures 30 act as guides which permit the sizing accuracy of the ultimate opening or port 10, which latter has a unique shape, as well as to facilitate the finishing process; said latter being normally difficult through machining requiring a drill or the like. Thus, the present invention is conducive to a substantial time-saving and also is productive of an insert having sizing accuracy.

Figure 10:
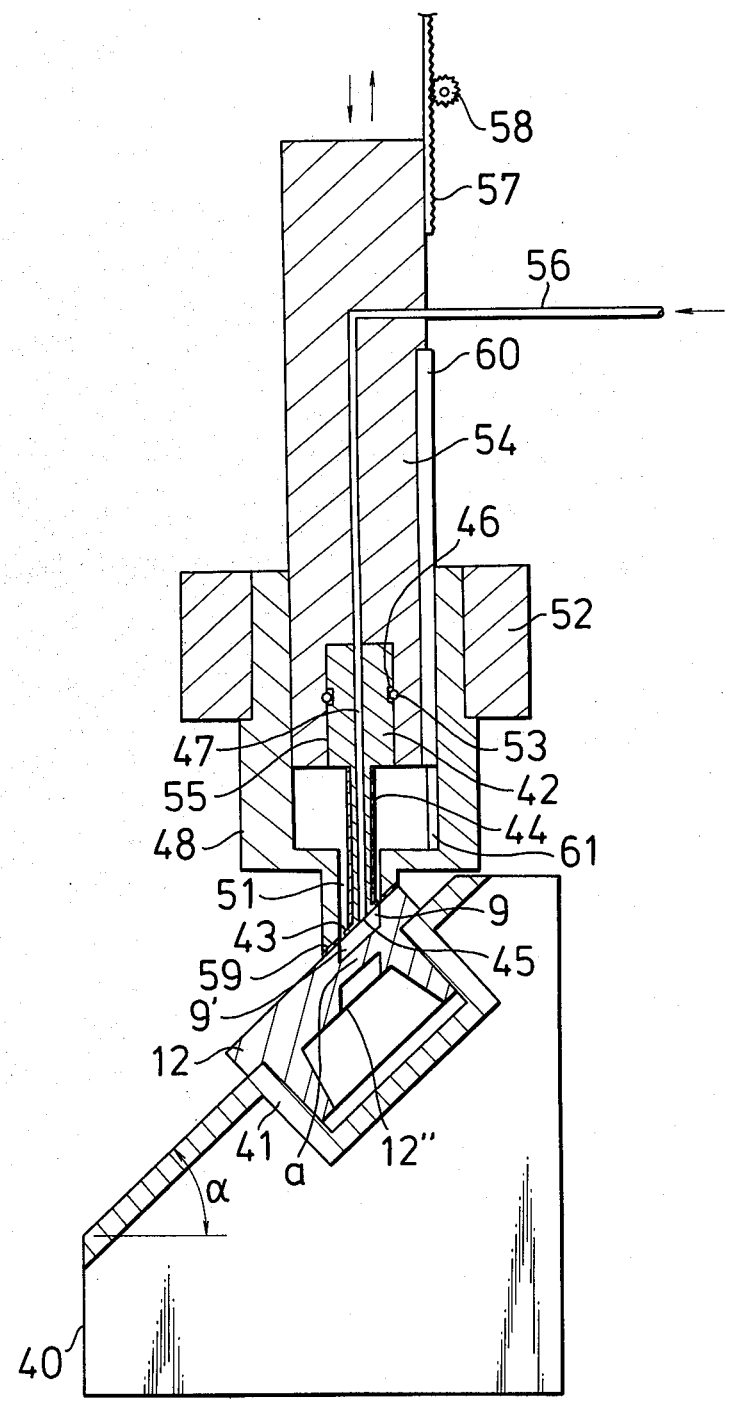
FIG. 10 is a transverse vertical sectional view illustrating the holing step as performed by electrolytic process according to the method of the present invention.
Figure 13:
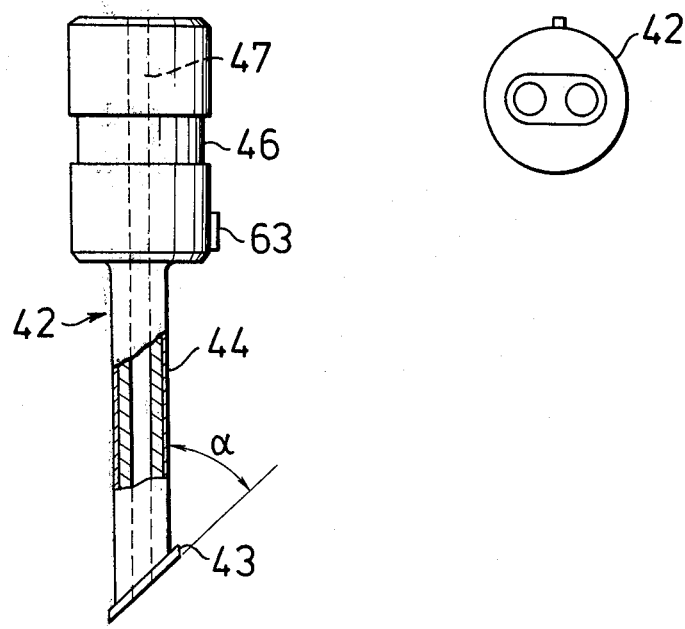
FIG. 13 (I) is a side elevation view, in partial section, of the electrode shown in FIGS. 10, 11, and 12.
Figure 14:
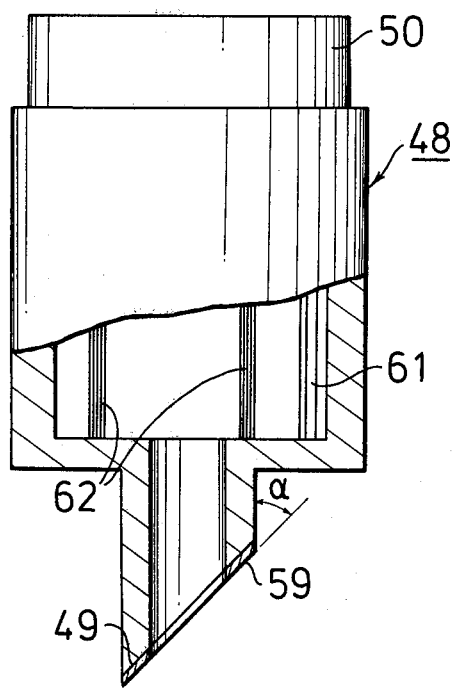
FIG. 14 is a side elevational view, in partial section, of the electrolytic working liquid guide tube illustrated in FIGS. 11, 12, and 13.

The electrolytic process for forming opening or port 10 in insert A is more fully illustrated in FIG. 10 wherein unfinished product 12 is maintained in position within a suitable recess formed in a mounting member 40 at the requisite angle necessary for developing opening 10 along the preselected axis. A working electrode 42 having its lower leading end at an angle substantially equal to the angle of inclination α of opening 10 and with there being a land 43 provided on such end; the electrode 42 being coated with a ceramic insulating material indicated at 44 in FIG. 13 (I). Electrode 42 comprises a conductive electrode holder 54 having a downwardly opening recess 55 for accepting the head or upper portion of electrode 42; said working electrode 42 being so disposed that the land-carrying leading end is substantially parallel to the base 9' of recess 9 of unfinished product 12. The upper end or head of electrode 42 is provided with a circumferential central recess 46 in which there is engaged a screw 53 connecting it to electrode holder 54 whereby electrode 42 may be moved vertically with electrode holder 54. Vertical travel of said electrode holder 54 may be affected by any suitable means, such as, for instance, by means of a rack 57 and pinion 58. Disposed surroundingly of electrode 42 is an electrolytic working liquid guide tube 48 fabricated of insulating material for preventing any burrs and streaks; said guide tube having a diametrically reduced extension at its lower end with there being a liquid proof seal 59 applied to the lower end face thereof. Said guide tube 48 is slidably engaged in its upper end portion to electrode holder 54 thereof by means of cooperation of a key 60 provided on said holder 54 and a key guide groove 61 formed on said tube 48. Guide tube 48 is provided in its upper portion with a recess 50 within which a weight 52 is received; and in its lower end portion, tube 48 is provided with an end face 49 formed at the same angle of inclination as that of the leading lower end of electrode 42. It will be seen that seal 59 is thus secured upon said end face 49. With reference to FIG. 12, it will be seen that the lower end of guide tube 48 surface-wise engages the outer or upper side face 12' of unfinished product 12 thereby effecting a seal therebetween. Accordingly, working electrode 42 is vertically movable within guide tube 48.

Figure 11:
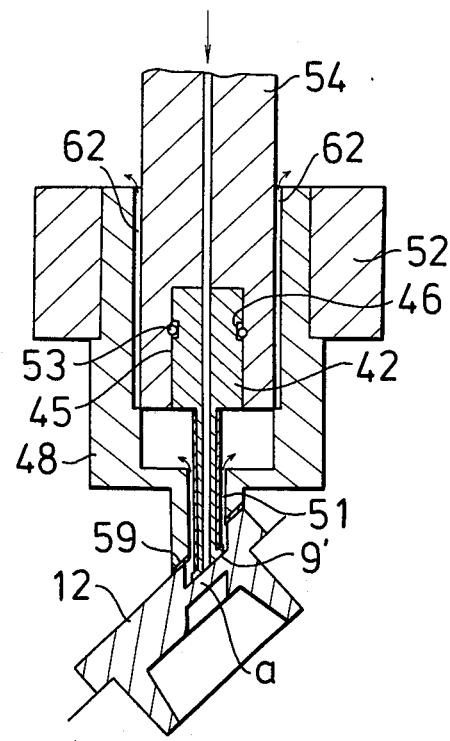
FIG. 11 is a fragmentary transverse vertical sectional view illustrating the step following that illustrated in FIG. 10.

As shown in FIG. 11, guide tube 48 is provided with a diametrically increased inner chamber in its upper end portion which is provided with a longitudinal groove 62 establishing a passage for the electrolytic working liquid. It may be recognized that electrode 42 is also formed with a passage for such working liquid.

With reference now being made to FIG. 10, with electrode 42 and guide tube 48 set in position with respect to recess 9 of unfinished product 12, the electrolytic working liquid is fed through a liquid supply conduit 56 which connects with a suitable passage extending through holder 54 for delivery to electrode 42; said conduit 56 being thus connected to a convenient source of liquid remote from said holder 54.

Conduit 56 connects to a liquid supply port 47 within electrode 42 and with there being a discharge port 45 at the lower end of said electrode 42. The said liquid is fed, preferably, at a rate of about 1.5-4.5 mm/min. to said recess 9. Until the leading end of electrode 42 protrudes through the portion a of the base of recess 9 to be removed, the working liquid will be discharged by flow through the restricted passage 51 between guide tube 48 and electrode 42, as indicated at arrows in FIG. 11. As a result, the outlet of such liquid is throttled to guide tube 48 which causes an elevation of pressure thereof until the flow is rendered irregular by reason of the so-called "back pressure" whereby the streak which might otherwise be developed due to the irregularity in the flow speed can be prevented. Concurrently, due to the guide tube 48, no portion of product 12 other than that constituted by the recess 9 is exposed to the liquid so that the burr which might otherwise be generated about the upper end of recess 9 and the resultant opening 10 can be prevented.

As shown in FIG. 12, when the leading end of electrode 42 removes portion a for development of the through opening, the supply of electrolytic working liquid is arrested and electrode 42 and tube 48 are removed so that the completed insert A may be withdrawn from mounting member 40.

The use of ceramic insulating material 44 upon electrode 42 has been developed to eliminate the potential for breakage during the spark. With conventional insulating material, such as types made of vinyl polyester or epoxy resin, the same, by reason of the particular mode of adherence and the possibility of melting, may be broken during the spark thereby markedly reducing the effective life of electrode 42. Ceramics such as porcelain enamel, including cloisonné enamel, have proved particularly advantageous; and by the utilization of ceramics, the sizing accuracy has been enhanced and the life of the electrode increased to a point greater than that required for the production of 1,000 units.

If desired, the portion of the tube disposed encirclingly of electrode 42 may be made of a synthetic resin, such as, vinyl chloride, epoxy resin, glass, or porcelain, and with the leading end seal 59 fabricated of any suitable sealing material, such as, rubber, both natural and synthetic, or synthetic resin. The portion of tube 48 defining the outer limit of passage 51 prevents the liquid from collecting on any portion of product 12 (or insert A) than that corresponding to the opening or port to be developed. Accordingly, the danger of a burr and/or streak is obviated and the sizing accuracy and the degree of finish may be achieved at an excellent level. Without guide tube 48, the liquid would manifestly flow about other portions of product 12 than merely against portion a, establishing a vortex flow so that a burr might develop. Clearly, the working liquid injected from the leading end of electrode 42 would be liable to become turbulent and thus establishing a streak in the wall of the opening 10 to be formed. Therefore, in view of the foregoing, the importance of the provision of tube 48 is apparent together with its coaction with electrode 42.

Also, the arrangement produced by tube 48 and electrode 42 accomplishes the intermixture of the gases as a further counter-measure against streak formation.

In the present invention, the method of electrolytic working means that the action of the electrochemical solution is concentrated upon for the portion which is closer to the negative pole has required shape on condition that the negative pole and the particular workpiece are charged with electricity supplying the electrolytic working liquid between the negative pole and the workpiece after the negative pole is closer to the workpiece. The electrolytic working liquid in the present invention may, desirably, but not necessarily, be a medicine in general use and set forth in Japanese Pat. No. 922,544 as the use of same will prevent any public harm. This particular, preferred, but not critical, liquid consists of adding sodium sulfite, potassium sulfite, sodium thiosulfate, or potassium thiosulfate as an additive to a liquid comprising an aqueous solution of sodium nitrate, potassium nitrate, sodium chlorate, or potassium chlorate. This electrolytic working liquid used consists of 50 g/l and 300 g/l. The liquid is tempered a low-pollution with a low-corrosion-resistant and the sizing accuracy.

Figure 15:
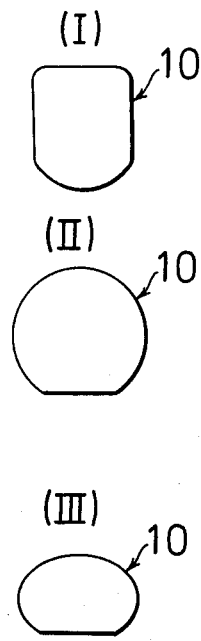
FIG. 15 (I), (II), and (III) illustrate top plan views of modified configurations of the insert opening.
Figure 16:
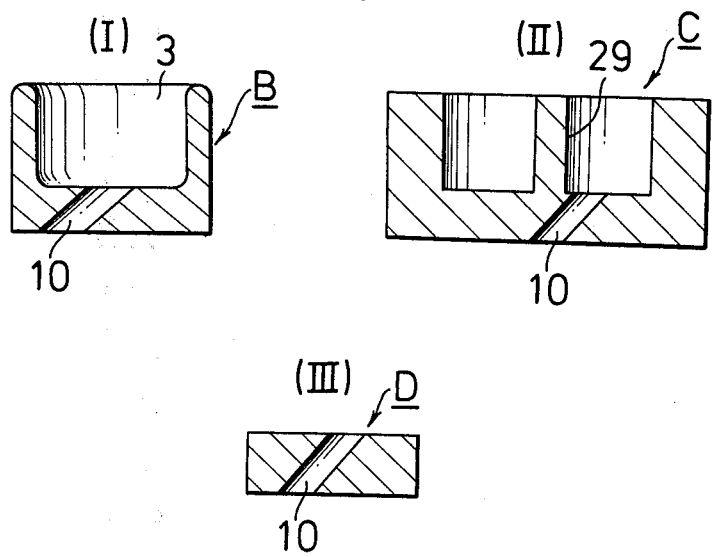
FIG. 16 (I), (II), and (III) are transverse vertical sectional views of modified forms of inserts constructed in accordance with the method of the present invention.

Although in the preferred embodiment opening or port 10, as shown in FIG. 1 (VI), is of elongated, generally rectangular configuration with the ends being of semicircular shape, such opening may be modified contourwise to present a generally square configuration with one side being arcuated and the remaining two outer corners being rounded (see FIG. 15 (I)); or of generally circular configuration with one chord-forming rectilinear side portion (see FIG. 15 (II)); or of broadly rectangular configuration but with the ends and one longitudinal side portion being arcuated, as illustrated in FIG. 15 (III). On the other hand, the shape of insert A need not be necessarily limited to the particular shapes disclosed in FIG. 1 (V) and (VI), but modified to present an insert B (see FIG. 16 (I)) which differs from insert A by elimination of flange 5. Insert A may also, if desired, be futher modified into the form indicated at C in FIG. 16 (II) wherein a partition p is located substantially centrally of the center recess 3. A still further modification of the insert A is shown in FIG. 16 (III) as at D which is of relatively simplified character in that it eliminates recess 3 in its entirety and hence the walls defining same.

The refractory steel of which the various forms of the insert of the present invention is fabricated contains less than 0.06% and, preferably, 0.04% of carbon, and an iron-based super-refractory alloy. A vacuum fusion material or an electroslab refusion material is especially suitable due to its excellent workability. A nickel- or cobalt-based super-refractory alloy can also be used but, due to its high cost, is not practically economical. If the carbon content exceeds 0.06%, the workability of the steel is so diminished that the refractory steel is not practical for use in the formation of the insert as is apparent from the graph set forth in FIG. 17 which illustrates the relationships between the resistance to deformation and the upsetting percentage.

Since, however, the member to be formed with the opening or injection port 10 is initially provided with the oblique recesses 9 and 11 during the pressing process of the work piece, the portion to be actually cut can be reduced and the cutting tool can be applied in a vertical position to the recess 9 in a manner similar to the usual holing process with a reduction in the working problems normally encountered, thus making it possible to use a material of construction which has been considered inappropriate and impractical heretofore, all as developed in the prior art. Acid and corrosion resistance properties of the refractory steel are directly improved as the carbon content is diminished. From the standpoint of workability and quality, therefore, is is preferable that a refractory steel having a carbon content less than 0.06% and, desirably, less than 0.04% be used. Thus, once again, reference may be made to FIG. 17 to demonstrate that the greater the workability, the lower the carbon content.

Refractory steel (HRB 89.5) of ferrite type, containing 0.045% of carbon, 23% of chromium, 0.4% of manganese, 0.5% of silicon, 0.03% of phosphorus, 0.03% of sulfur, and the remainder of iron, was used to form the unfinished insert product 12, as shown in FIG. 12.

Then, as shown in FIG. 7, said product 12 was presented by means of work holder 29 so that the oblique recess 9 with the bottom 9' thereof is held in a horizontal position. Then, the opening or hole 10 was formed in such an oval shape at an angle of inclination of 42 degrees ±30 minutes, the semi-major axis b and e being 12.8±0.15 mm and the semi-minor axes c and d at the ends being 5.75±0.15 mm. Reference is made to FIGS. 18, 19, and 20.

Other materials of construction for the insert of the present invention which have proved efficacious will be considered collectively and all of which may be subjected to the same procedure as discussed in the foregoing paragraph. Among such preferred materials are the following:

1. Austenitic stainless steel of SUS 310 (containing 19 to 22% of nickel, 24 to 26% of chromium, and less than 0.06% of carbon;
2. Austenitic stainless steel of SUS 309 (containing 12 to 15% of nickel, 22 to 24% of chromium, and less than 0.06% of carbon;
3. Austenitic stainless steel of SUSXM 7 (containing 8.5 to 10.5% of nickel, 17 to 19% of chromium, and less than 0.06% of carbon;
4. Ferrite stainless steel of SUS 405 (containing 11.5 to 14.5% of chromium and less than 0.06% of carbon;
5. Ferrite stainless steel of SUS 430 (containing 16 to 18% of chromium and less than 0.06% of carbon;
6. Low carbon alloy steel having a content close to that of SUH 31 (containing 13 to 15% of nickel, 14 to 16% of chromium, and less than 0.06% of carbon;
7. Low carbon alloy steel having a content close to that of SUH 33B (containing 19 to 22% of nickel, 24 to 26% of chromium, and less than 0.06% of carbon;
8. Low carbon alloy steel having a content close to that of SUH 446 (containing 23 to 27% of chromium and less than 0.06% of carbon;
9. Low carbon alloy steel having a content close to that of SUH 3 (containing 10 to 12% of chromium, 0.70 to 1.0% of molybdenum, and less than 0.06% of carbon.

The method of producing the insert of the present invention as herein described was compared with that of producing the insert by the use of the boring end mill of a milling machine with such comparative factors being tabulated as follows:

|  | Working Process | Working Time | Consump. of Tool | Cost for Facilities | Masspro-ductivity |
| --- | --- | --- | --- | --- | --- |
| Ex. | Machine (Note 1) | 30 secs. | Low | Low | High |
|  | Machine (Note 2) | 45 secs. | Low | Low | High |
| Ref. | Spark | 95 mins. | High | High | Low |
|  | Machine (Note 3) | 3 mins. | High | High | Low |
|  | Machine (Note 4) | 4 mins. | High | High | Low |

Note 1: Super-Hard End Mill, Four-Bladed, 2000 rpm;
Note 2: Super-Hard End Mill, Two-Bladed, 2000 rpm;
Note 3: Super-Hard Boring End Mill, Four-Bladed, 2000 rpm;
Note 4: Super-Hard Boring End Mill, Two-Bladed, 2000 rpm.

The above Reference was tested for the case in which the member 4 shown in FIG. 1 (III) was formed with the injection port having a cutting distance of 21 mm. The distance of the portion a of the unfinished insert product 12 in the present Example was 4.2 mm, about one-fifth of the afore-mentioned cutting distance. As a result, the machining process in the Reference necessitated resort to a super-hard boring end mill, but the machining process in the present Example could form the hole without any difficulty by means of the super-hard end mill of the usual shape.

As has been described hereinabove, as the recess 9 may be formed on one side or on both sides, as by recesses 9 and 11, of the intervening portion corresponding to the port to be developed by the pressing process before the holing process, the holing tool, such as the drill, is applied in a vertical position to the bottom of the recess 9 in a manner similar to the usual boring method so that the desired port 10 may be formed with high accuracy and quite easily. Since, moreover, the length to be holed is short and since the tool can be smoothly applied, as has been described in the above, the holing process can be accomplished without any difficulty with the use of the end mill having the usual shape so that the insert can be mass-produced at a low price.

What is claimed is:

1. A method of producing an insert for the combustion chamber of a diesel engine having an oblique injection port comprising inserting a cylindrical work blank into a die, then cold- or hot-compressing such cylindrical work blank between a punch and counter-punch to form a compressed center-recessed shape, forming an oblique recess in at least one side of the bottom of the center recess of said shape at such an end position as to correspond to the injection port to be formed, and then developing a hole in said oblique recess in conformity with the configuration and extent thereof.

2. A method as set forth in claim 1 wherein the formation of the oblique recess is effected simultaneously with the compressing shape.

3. A method as set forth in claim 1 wherein said formation of said oblique recess is effected immediately subsequent to the compressing step.

4. A method as set forth in claim 1 wherein the oblique recess is formed in the outer side of the bottom of the compressed material.

5. A method as set forth in claim 1 wherein the oblique recess is formed in the inner side of the bottom of the compressed material.

6. A method as set forth in claim 1 wherein an oblique recess so formed in both the inner side and the outer side of the bottom of the compressed material, said recesses being in alignment.

7. A method as set forth in claim 1 wherein the cylindrical work blank is fabricated of high refractory steel.

8. A method as set forth in claim 7 wherein the high refractory steel contains less than 0.06% carbon.

9. A method as set forth in claims 1 or 4 wherein the hole is formed by punching.

10. A method as set forth in claims 1 or 4 wherein the oblique hold is formed by cutting.

11. A method as set forth in claims 1 or 4 wherein the oblique hole is formed by spark.

12. A method as set forth in claims 1 or 4 wherein the oblique hold is formed by electrolytic working process.

13. A method as set forth in claim 1 wherein the oblique hole is electrolytically finished.

* * * * *